(12) United States Patent
Sigalas et al.

(10) Patent No.: US 7,794,821 B2
(45) Date of Patent: Sep. 14, 2010

(54) COMPOSITE MATERIAL FOR DRILLING APPLICATIONS

(76) Inventors: Iakovos Sigalas, 112 Third Street, Linden, 2195 (ZA); Mosimanegape Stephen Masete, 190 Leopard Rock, Hendrinah Street, Ridgeway Ext 8, 2091, Johannesburg (ZA)

( * ) Notice: Subject to any disclaimer, the term of this patent is extended or adjusted under 35 U.S.C. 154(b) by 353 days.

(21) Appl. No.: 10/560,020

(22) PCT Filed: Jun. 11, 2004

(86) PCT No.: PCT/IB2004/001921
§ 371 (c)(1),
(2), (4) Date: Jul. 7, 2006

(87) PCT Pub. No.: WO2004/111284
PCT Pub. Date: Dec. 23, 2004

(65) Prior Publication Data
US 2007/0054101 A1    Mar. 8, 2007

(30) Foreign Application Priority Data
Jun. 12, 2003    (ZA) .................... 2003/4589

(51) Int. Cl.
*B32B 27/00* (2006.01)
(52) U.S. Cl. .................... 428/212; 428/292.1; 428/408; 175/374; 175/426; 175/428; 51/293; 51/307
(58) Field of Classification Search .............. 428/292.1, 428/212, 408, 336; 175/374, 426, 428; 51/293, 51/307
See application file for complete search history.

(56) References Cited

U.S. PATENT DOCUMENTS

| 4,694,918 | A | 9/1987 | Hall |
| 5,096,465 | A | 3/1992 | Chen et al. |
| 5,151,107 | A | 9/1992 | Cho et al. |
| 5,288,297 | A | 2/1994 | Ringwood |
| 5,326,380 | A | 7/1994 | Yao et al. |
| 6,454,027 | B1 * | 9/2002 | Fang et al. .................. 175/374 |

FOREIGN PATENT DOCUMENTS

WO    WO 00/38864    7/2000

* cited by examiner

*Primary Examiner*—David R Sample
*Assistant Examiner*—Lawrence D Ferguson
(74) *Attorney, Agent, or Firm*—Scully, Scott, Murphy & Presser, P.C.

(57) ABSTRACT

A composite material consists of a plurality of cores dispersed in a matrix. The cores are formed of ultra-hard material, or the components for making an ultra-hard material. The matrix is formed of the components for making an ultra-hard material of a grade different to that of the cores, and a suitable binder. The ultra-hard material is polycrystalline in nature and is typically PCD or PcBN. The cores are typically provided as granules coated with the components for making an ultra-hard material and the binder. The composite material typically takes on a honeycomb structure of an ultra-hard material and cores within the pores of the honeycomb structure bonded to the honeycomb structure. The pores of the honeycomb structure may be ordered or random.

9 Claims, 3 Drawing Sheets

COMPOSITE MATERIAL FOR DRILLING APPLICATIONS

BACKGROUND OF THE INVENTION

This invention relates to a composite material, a method of making the composite material and a method of making a tool component.

Polycrystalline diamond (herein referred to as PCD) and polycrystalline cubic boron nitride (herein referred to as PcBN) are well known materials used in cutting and abrasive applications. PCD cutters are well-known and widely used in drill bit technology as the cutting element in drill bits used in core drilling, oil and gas drilling, and other similar applications. Such cutters generally comprise a PCD table formed on a hard metal substrate by a high temperature—high pressure sintering process. The substrate is then either brazed on an elongated support, or is directly brazed in a pocket of the drill bit, in a manner that exposes the PCD table to the surface for rock cutting.

It is known that PCD cutters with a thick PCD table can enjoy a prolonged useful life during the drilling operation. This is simply due to the fact that there is more of the ultrahard phase available for performing the rock cutting and shearing operation. However, a cutter with a thick PCD table layer, once a wear scar is formed, attacks the rock by applying the cutting loads on the rock through the part of the PCD table that is in contact with it. If the PCD layer is much thicker than those found in conventional cutters, then the cutting loads are distributed over a large area on the face of the rock being engaged. Therefore the cutting stresses are low, and the cutting efficiency is reduced. An engineering solution to maintaining a sharp edge is proposed by U.S. Pat. No. 5,301,762 to Besson, in which propositioned grooves are placed in the structure, in order to generate a chipping effect that will generate a sharp fresh cutting edge. Such a technique uses up a significant proportion of the cutter's useful PCD material by fracturing it away, and cannot be cost effective.

In EP 0 196 777 to Wardley a way of maintaining sharpness of the PCD table by grading the wear resistance of said table is proposed. Specifically, the top layer is made of more wear resistant material than the layer adjacent to the substrate of the drilling cutter. The result is that the PCD layer below the top surface wears faster than the top layer, thus giving rise to a lip. This development generates a self-sharpening effect. The improved wear resistance is typically achieved by making the top PCD layer out of a fine grained PCD, and/or by reducing the amount of binder material used in comparison to the amount used to make less wear resistant layers. However, such thick PCD layers, when they contain fine grain diamond, are difficult to infiltrate with the necessary binder material. Therefore such cutters are difficult to sinter.

It is claimed in U.S. Pat. No. 4,311,490 that such problems can be overcome by using coarse diamond particles as the starting material for the PCD layers adjacent to the substrate. Although such an approach helps, it does not eliminate the problem of infiltrating the top fine-grained layers, which in modern cutters can have substantial thickness. As such PCD tables become thicker, toughness of the PCD table becomes increasingly important, due to the volume effect associated with the fracture probability of brittle materials. A number of disclosures deal with this problem.

In U.S. Pat. No. 6,361,873 to Siracki et al an ordered structure of two phases that enhances the material's chipping resistance is disclosed. This is a very general patent, and does not address any other aspect than toughness of a structure. In U.S. Pat. No. 4,604,106 it is suggested that the admixing of two phases in a random, but graded manner can be used to address stress management, as well as toughening of the structure. U.S. Pat. No. 6,06,352 to Rai and U.S. 2002/194955 disclose coated fibre and granule structures, respectively, in order to generate tough structures. In both the fibres and the granules, the core is made from ultrahard polycrystalline based materials, while the rim is made from. Hard metals or cermets. In all these cases, these advantages are attained at the sacrifice of wear resistance, as a result of the introduction of the less wear resistant cermets.

SUMMARY OF THE INVENTION

According to one aspect of the invention, a composite material comprises a plurality of cores of ultra-hard material, or the components for making an ultra-hard material, dispersed in a matrix, the matrix comprising the components for making an ultra-hard material of a grade different to that of the cores, and a suitable binder.

The ultra-hard material is polycrystalline in nature and is typically PCD or PcBN.

The cores are typically provided as individual particles or in the form of granules.

In one embodiment of the invention the cores are made from a fine-grained PCD grade material and the matrix of a coarser PCD grade material than that of the cores.

In an alternative embodiment of the invention, the cores may be formed of a coarser PCD grade material and the matrix of a fine-grained PCD grade material.

In a further alternative embodiment of the invention, the cores may be formed of PCD and the matrix of PcBN type material. Such PcBN may encompass cubic boron nitride grains sintered to themselves, and/or with any number of ceramic phases comprising nitrides, borides, carbides or carbonotrides of aluminium, titanium, tungsten, hafnium, zirconium, silicon, niobium, and tantalum.

In yet another alternative embodiment of the invention, the cores may be formed from PcBN type material. Such PcBN may encompass cubic boron nitride grains sintered to themselves, and/or with any number of ceramic phases comprising nitrides, borides, carbides or carbonotrides of aluminium, titanium, tungsten, hafnium, zirconium, silicon, niobium, and tantalum. In this embodiment the rim may be formed out of PCD.

The fine-grained PCD grade material preferably has grains having a grain size in the range of about 0.1 to about 20 microns. The coarser PCD grade material preferably has grains having a grain size in the range of about 10 to about 100 microns. If core and rim, in the case of granules, are made from the same type of ultrahard material, then the particle size of the core is significantly different from that of the rim, by between about 5 and about 70 microns. Alternatively, the core and the rim of the granules can both be made from the same material, but with different binder phases.

Alternatively, the core and the rim of the granules may be made from mixtures of two types of ultrahard materials, such as PCD and PcBN, but those mixtures being substantially different from each other.

According to a further aspect of the invention, a method of producing a composite material as described above includes the steps of:
  (i) providing a plurality of cores of an ultra-hard material or the components for making an ultra-hard material;
  (ii) providing the components for making an ultra-hard material of a different grade to that of the cores and a suitable binder; and (iii) consolidating the cores, components and binder to produce a composite material.

According to yet another aspect of the invention, a method of producing a tool component includes the steps of:
(i) providing a substrate;
(ii) providing a composite material as described above;
(iii) placing a layer of the composite material on a surface of the substrate to produce an unbonded component; and
(iv) subjecting the unbonded component to conditions of elevated temperature and pressure suitable to produce an ultra-hard material.

The cores are typically provided as granules coated with the components for making an ultra-hard material and the binder.

The composite may be a moulded composite, which takes on the shape of the surface of the substrate on which it is placed. In this regard, the composite may be pre-cast in the appropriate form or, alternatively, moulded in situ.

The composite material typically takes on a honeycomb structure of an ultra-hard material and cores within the pores of the honeycomb structure bonded to the honeycomb structure. The pores of the honeycomb structure may be ordered or random.

The components necessary to produce either grade of ultra-hard material may comprise a mass of ultra-hard abrasive particles and optionally a second phase comprising a solvent/catalyst or a precursor to a solvent/catalyst, in particulate form, for the ultra-hard abrasive particle. Such components may include the superalloys, such as the Nimonic® and Stellite® alloys, and high temperature brazes as well as the metals iron, nickel and cobalt. They may also contain other elements such as titanium, tungsten, tantalum, silicon, molybdenum, zirconium, and niobium. The second phase may also be silicon carbide, this phase being generated by admixing silicon or its precursors with the diamond grains prior to sintering, and by reaction-sintering the mix when sintering the whole body of the granules at high temperatures and pressures.

The sintering conditions are such that the ultra-hard abrasive particles are crystallographically stable.

The particles in the core and in the coating are provided in a suitable binder, such as an organic binder. This binder will preferably be removed prior to the sintering of step (iv). Examples of suitable binders include but are not limited to camphor, methylcellulose and polyethylene glycol.

The plurality of granules may be consolidated by applying pressure to the granules, for example, in a confined space such as a die. The consolidated composite is a green state product which has coherency, but which may also be severed, for example, by cutting. A piece which may be severed and removed from the consolidated or coherent composite has flexibility and may be applied to surfaces, which are flat or profiled, e.g. a curved surface. The die for consolidating the granules may be provided with one or both punches profiled such that the green state product has at least one surface that has a shape complementary to the substrate upon which it is to be placed. In this case, the composite layer presents a working surface or a cutting edge. Either surface may be profiled to accommodate a further layer such as an ultra-hard material layer or another layer of a composite material but of a different composition, for instance having cores of hardmetal coated with ultra-hard material or the components for making the ultra-hard material, to provide for a grading of properties. Several interlayers of composite material having different compositions may be provided.

Where the cores of the additional composite material are formed from carbide particles, these will typically be tungsten carbide particles, titanium carbide particles, tantalum carbide particles or molybdenum carbide particles. The metal binder may be any metal binder known in the art such as iron, nickel, cobalt or an alloy containing one or more of these metals.

The substrate will typically be a cemented carbide substrate.

The granules may be produced by providing a core and then coating the core with an ultra-hard material in the presence of an organic binder. Coating may take place by fluidising the cores and spraying the coating thereon or by pelletising in a pan. The granules may be made of more than one layer, each layer comprising PCD of different grain sizes, or different types of PcBN, or mixtures of both.

BRIEF DESCRIPTION OF THE DRAWINGS

The invention will now be described in more detail, by way of example only, with reference to the accompanying drawings in which.

DESCRIPTION OF EMBODIMENTS

Figure 1:
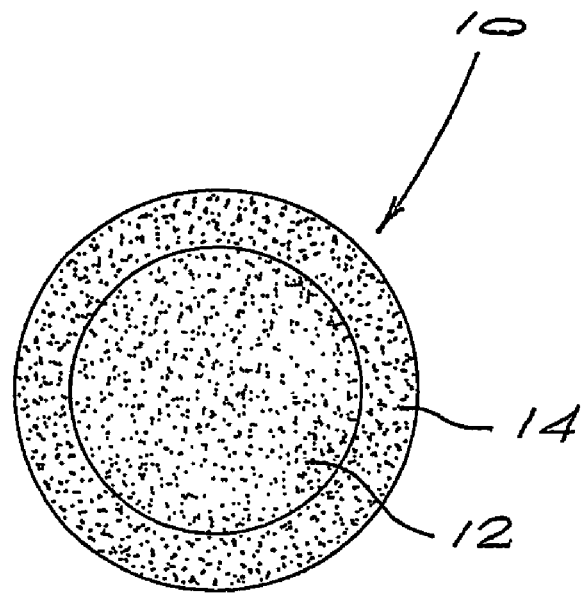
FIG. 1 is a cross section through a granule used in making a composite material of the invention.

Referring to FIG. 1, a granule 10 comprises a core 12 and a coating 14 substantially enclosing the core 12. The granule 10 illustrated is of uniform shape and spherical. The granule does not have to be of such uniform shape, nor need it be spherical. Other shapes are possible.

In this embodiment, the core 12 is made from a fine-grained PCD grade material, typically in the range of 0.1 to 12 microns in grain size. This grade is endowed with high wear resistance and high strength.

The coating 14 is made from a coarser PCD grade material than that of the core 12, typically 10 to 100 microns in grain size. This grade has lower strength and wear resistance than the core material. The coarser grade material will also maintain large size pores during the high-pressure compaction process, thus providing wide conduits for the molten binder during the infiltration process.

The core 12 and coating 14 are both comprised of ultra-hard abrasive particles such as diamond or cubic boron nitride and optionally a metal or precursor in particulate form. Such metal may be a solvent/catalyst or another metal, which will sinter under the applied conditions of temperature and pressure.

An organic binder such as methylcellulose is present in both the core 12 and the coating 14 and provides both the core 12 and the coating 14 and the granule 10 as a whole with coherency. Other non-limiting examples of the organic binder include camphor and polyethylene glycol.

Figure 2:
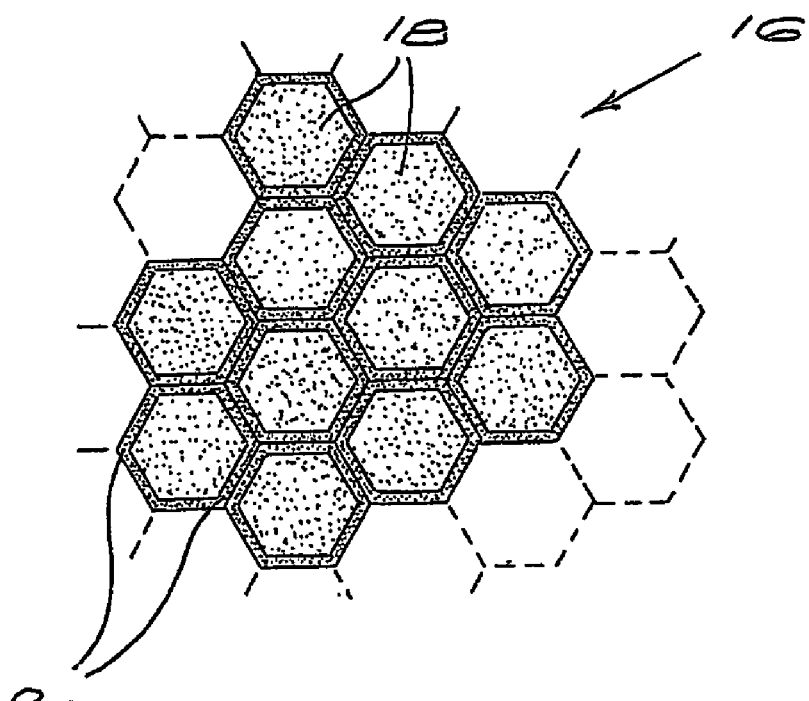
FIG. 2 is a cross section through a consolidated composite material of the invention.

FIG. 2 shows the resulting microstructure 16 after compaction of a plurality of granules 10. This microstructure now has a set of wear resistant cores 18, the so-called fine-grained phase, and a continuous or coarse-grained phase 20 of coarse-grained PCD that is not as strong, and is less wear resistant, than the cores 18. The result is that when cutting rock, the continuous phase 20 will wear preferentially, thus causing the wear resistant cores 18 to slightly protrude. These protrusions will concentrate the cutting forces on small areas of the rock face, thus improving cutting efficiency. This is a self-sharpening effect.

Since the fine-grained phase has a thermal expansion coefficient that is higher than that of the coarse-grained one, the fine-grained phase will be in tension in the final compact. Therefore, in an alternative embodiment, if the structure is inverted with the fine-grained phase placed at the rim of the granules, and the coarse-grained phase at their core, the resulting compact will have a continuous phase that is in tension. Such a phase will encourage any cracks that run through it to follow the path defined by the continuous phase, thus forcing it to take a tortuous path. This will increase the fracture toughness, and therefore the chip and spall resistance of this phase.

In yet a further embodiment, the composite material of the invention can be combined with another material, made from granules with a hard metal core and a PCD rim, to generate a continuously graded structure. Such a structure would offer the advantages of thick PCD layers, self-sharpening, and stress management by way of grading.

The coarse-grained continuous phase will present the infiltrating metal from the substrate with large pores, thus allowing for easy infiltration. This will make sintering of thick PCD layers made from such a material much easier to sinter than conventional fine grained PCD, or graded layers where the layer adjacent to the hard metal substrate is made from coarse grains, and the layer furthest from the substrate is made from fine grained diamond.

The final size of the cores may be between 5 and 300 microns. The volume fraction of the cores in the sintered structure may be between 10 and 90 percent.

The invention will now be described further with reference to the following non-limiting examples.

EXAMPLE 1

Figure 3:
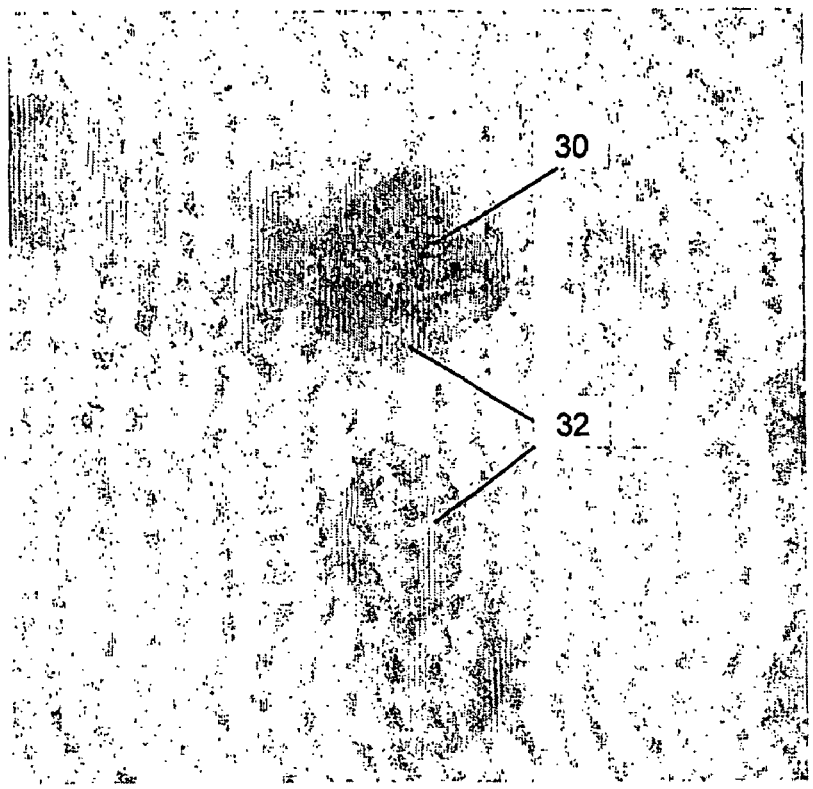
FIG. 3 is a photograph of coated granules of the invention.
Figure 4:
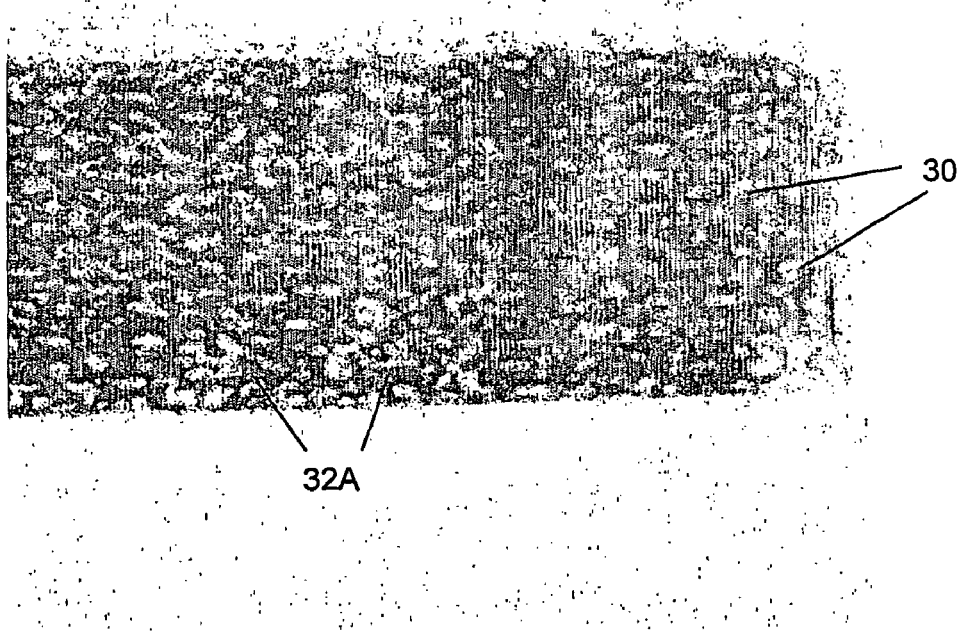
FIG. 4 is a photograph of a cross section through a portion of a tool component of the invention.
Figure 5:
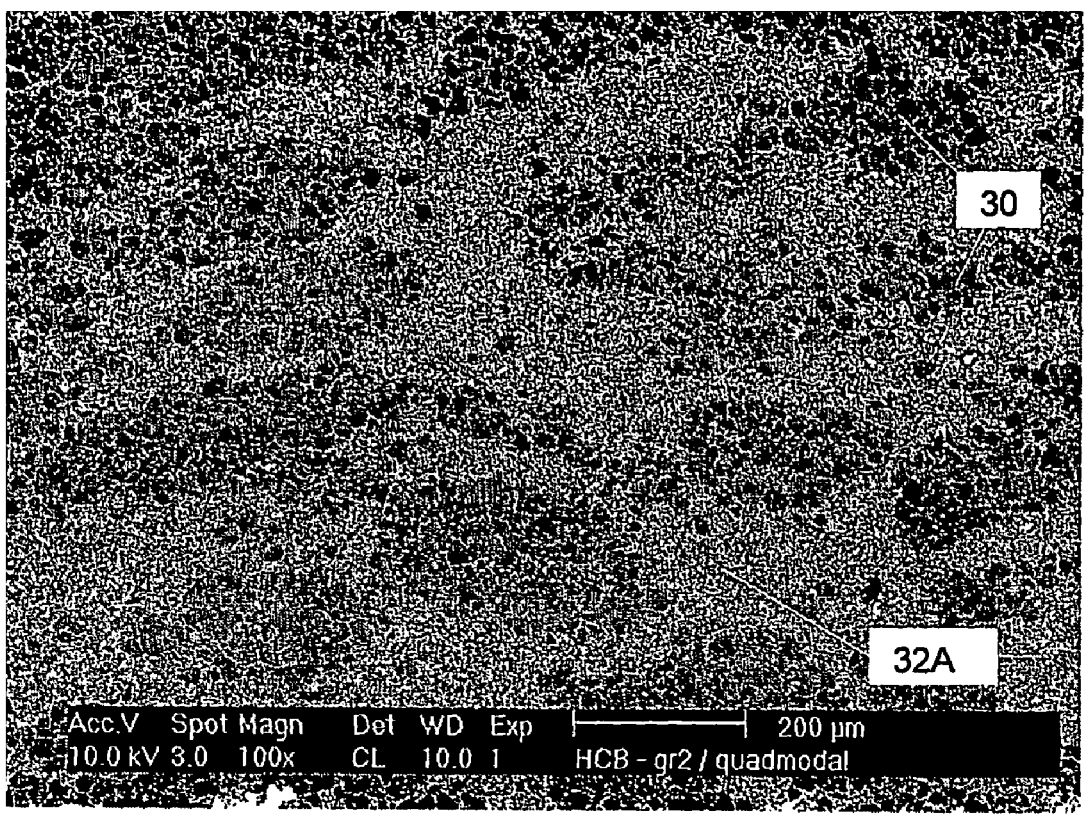
FIG. 5 is a SEM of a composite material of the invention comprising diamond granules dispersed in a fine grain diamond matrix.

A solvent based slurry of coarse diamond powder was prepared with approximately 4 wt % organic binder. The slurry was dried and crushed with pestle and mortar to produce green diamond particles screened to about 200 to 300 microns in size. The granules were placed into a pan granulator and rolled while small additions of a fine diamond powder with an organic binder were added to effect coating. Volume % of diamond granules to diamond coating was in the ratio of 1:1. The coated diamond particles are depicted in FIG. 3, where 30 is a coarse diamond granule and 32 the diamond coating. The coated green granules were placed into a reaction cell and covered with a WC-13% Co substrate. The arrangement produced a unit with a PCD layer consisting of sintered diamond granules in a matrix of another sintered diamond type. Binder removal was done in air at 400° C. for 2 hours. The pre-outgassed units were then outgassed in vacuum at 1100° C. for 25 minutes, and loaded into a reaction capsule for high temperature high pressure treatment. The resultant pressed compacts were processed, SEM characterised and wear tested. The resultant compact is depicted in the photograph of FIG. 4 and the SEM of FIG. 5, with the coarser diamond granules 30 now dispersed in a diamond matrix 32A. This material was tested in a conventional Paarl granite test, and developed a wear scar measuring about 0.300 mm in length, which is an exceptionally good performance in such a test. Such good wear resistance results would not normally be associated with PCD cutters using coarse diamond, which indicates the advantages of incorporating the coarse diamond in a fine diamond matrix.

EXAMPLE 2

In example 1, diamond granule shape was uncontrolled leading to irregular shaped granules. As granules can be of any shape, diamond granules of example 2 were made spherical before coating with diamond powder. The spherical shape was achieved by rolling irregular shaped granules in a granulator with additions of diamond powder to coat. The granules were then sieved to achieve 200 to 300 micron sized pellets. These granules were then coated with another diamond powder type. A compact was pressed as in example 1. Whilst not tested, it is expected that such a compact would compare favourably with the compact of example 1.

EXAMPLE 3

The same procedure as in example 1 was followed except that the granules were admixed and not coated. Granules from coarse grained powder were admixed in a fine grained diamond powder. A compact was pressed as in example 1. In a conventional Paarl granite test, the material tested developed a wear scar of about 0.325 mm, which once again exhibits a very good wear resistance for the PCD material.

EXAMPLE 4

In this example, granules from fine grained diamond powder were admixed in a coarse grained diamond powder. A compact was pressed as in example 1. In the conventional Paarl granite test, a wear scar of about 0.326 mm developed in the PCD material tested, which once again indicates very good wear resistance.

All of the materials tested in the Paarl granite wear test showed favourable wear scar developments and high wear resistance. Generally, coarser diamond provides for greater toughness of the PCD, but at the cost of wear resistance. By contrast, the PCD materials of the invention enjoy the toughness provided by the coarser diamond, but improved wear resistance as a result of the presence of the finer diamond.

The PCD composites of the invention increase the possibility of sintering PCD layers of large thickness whilst maintaining good wear resistance, and providing the cutter with a self-sharpening effect.

The invention claimed is:

1. A composite material comprising an assemblage of ultrahard core-shell grains bonded together throughout the composite material, wherein the core-shell grains have a core-shell structure in which the core is comprised of a first set of particles of a polycrystalline ultrahard material and the shell is comprised of a second set of particles of a polycrystalline ultrahard material different in particle size or composition from the first set of particles, and said grains are bonded together throughout the composite material by having the shells of said grains directly bonded together throughout the composite material.

2. A composite material according to claim 1, wherein one of the core or shell particles are comprised of polycrystalline diamond while another of the core or shell particles are comprised of polycrystalline cubic boron nitride.

3. A composite material according to claim 1, wherein one of the core or shell particles have a finer particle size than another of the core or shell particles.

4. A composite material according to claim 1, wherein one of the core or shell particles have a composition different than another of the core or shell particles.

5. A composite material according to claim 3, wherein the fine-grained particles have a size in the range of about 0.1 to about 20 microns.

6. A composite material according to claim 3, wherein the coarser particles have a size in the range of about 10 to about 100 microns.

7. A composite material according to claim 1, wherein the core and shell particles are made of the same type of polycrystalline ultrahard material, and the particle size of the core particles differs from that of the shell particles by about 5 to about 70 microns.

8. A composite material according to claim 3, wherein one of the core or shell particles are comprised of polycrystalline diamond while another of the core or shell particles are comprised of polycrystalline cubic boron nitride.

9. A composite material according to claim 1, wherein the core and shell particles are each made from mixtures of two types of polycrystalline ultrahard materials, wherein said mixtures are different from each other.

* * * * *